(12) United States Patent
West et al.

(10) Patent No.: US 10,971,815 B1
(45) Date of Patent: Apr. 6, 2021

(54) ELEMENT LEVEL POLARIZATION SYNTHESIS NETWORK FOR ELECTRONICALLY SCANNED ARRAYS

(71) Applicant: Rockwell Collins, Inc., Cedar Rapids, IA (US)

(72) Inventors: James B. West, Cedar Rapids, IA (US); Michael L. Hageman, Mount Vernon, IA (US); Russell D. Wyse, Center Point, IA (US); Jiwon L. Moran, Marion, IA (US); Lee M. Paulsen, Cedar Rapids, IA (US); Michael C. Meholensky, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 168 days.

(21) Appl. No.: 16/146,349

(22) Filed: Sep. 28, 2018

(51) Int. Cl.
*H01Q 3/26* (2006.01)

(52) U.S. Cl.
CPC .................... *H01Q 3/26* (2013.01)

(58) Field of Classification Search
CPC ........ H01Q 3/26; H01Q 3/267; H01Q 3/2676; H01Q 21/0025; H01Q 25/00
USPC .......................................................... 342/368
See application file for complete search history.

(56) References Cited

U.S. PATENT DOCUMENTS

| | | | | |
|---|---|---|---|---|
| 4,297,706 A * | 10/1981 | Nikolayuk | ............. | H01Q 21/24 343/771 |
| 8,466,846 B1 * | 6/2013 | Elsallal | ................ | H01Q 21/062 343/770 |
| 8,743,015 B1 * | 6/2014 | West | ..................... | H01Q 21/205 343/878 |
| 2009/0073072 A1 * | 3/2009 | Lindenmeier | ........ | H01Q 1/3275 343/810 |
| 2012/0189078 A1 * | 7/2012 | Eom | ...................... | H01Q 1/246 375/295 |
| 2017/0338558 A1 | 11/2017 | West | | |
| 2018/0020363 A1 * | 1/2018 | Faxer | ..................... | H04L 5/005 |
| 2018/0062262 A1 * | 3/2018 | Kasemodel | ............ | H01Q 21/26 |

OTHER PUBLICATIONS

U.S. Appl. No. 15/825,711, filed Nov. 29, 2017, West et al.
U.S. Appl. No. 15/972,608, filed May 7, 2018, West et al.
U.S. Appl. No. 16/021,784, filed Jun. 28, 2018, Paulsen et al.
U.S. Appl. No. 16/123,854, filed Sep. 6, 2018, West et al.
U.S. Appl. No. 16/142,130, filed Sep. 26, 2018, Wyse, Russell D.
U.S. Appl. No. 16/147,252, filed Sep. 28, 2018, West, James B.

\* cited by examiner

*Primary Examiner* — Harry K Liu
(74) *Attorney, Agent, or Firm* — Suiter Swantz pc llo

(57) ABSTRACT

Systems and methods of controlling signal polarization for an antenna system are provided herein. The antenna system includes an ultra wide band or greater array of dual linear polarization elements. The antenna system also includes polarization synthesis networks. Each of the polarization synthesis networks is coupled to the first differential interface of the first element of a respective dual linear polarization element of the dual linear polarization elements and the second differential interface of the second element of the respective the dual linear polarization element of the dual orthogonal linear polarization elements. Each of the polarization synthesis networks has a flat response for phase shift and amplitude over the ultra wide bandwidth.

14 Claims, 9 Drawing Sheets

ELEMENT LEVEL POLARIZATION SYNTHESIS NETWORK FOR ELECTRONICALLY SCANNED ARRAYS

CROSS REFERENCE TO RELATED APPLICATIONS

The present application is related to U.S. patent application Ser. No. 15/972,608, filed Jun. 28, 2018, U.S. patent application Ser. No. 16/021,784, filed Jun. 28, 2018 U.S. patent application Ser. No. 16/147,252 filed on Sep. 28, 2018, U.S. patent application Ser. No. 16/142,130 filed on Sep. 26, 2018, and U.S. patent application Ser. No. 16/123,854 filed on Sep. 6, 2018. Each of the above listed applications is incorporated herein by reference in its entirety and assigned to the assignee of the present application.

BACKGROUND

Embodiments of inventive concepts disclosed herein relate generally to communication systems including but not limited to antenna systems for and methods of communicating signals having polarization characteristics.

Modern sensing and communication systems may utilize various types of antennas to provide a variety of functions, such as communication, radar, and sensing functions. For example, ultra-high frequency (UHF) and very high frequency (VHF) radio systems use directional and omnidirectional antenna arrays for data and voice communication. In another example, radar systems use antenna arrays to perform functions including but not limited to: sensing, intelligence gathering (e.g., signals intelligence, or SIGINT), direction finding (DF), electronic countermeasure (ECM) or electronic self-protection (ESP), electronic support (ES), electronic attack (EA) and the like. Various active electronically scanned array (AESA) applications utilize a particular polarization state, such as linear, circular, or elliptically polarizations for communicated or sensed radio frequency (RF) signals. Some applications operate across a large band (ultra-wide band (UWB) or ultra-ultra-wide band (UUWB)).

SUMMARY

In one aspect, embodiments of the inventive concepts disclosed herein are directed to an antenna system. The antenna system includes an ultra wide band or greater array of dual linear polarization elements. Each of the dual linear polarization elements is disposed in a respective one-half wavelength by one-half wavelength unit size, and the dual linear polarization elements include a first element have a first differential interface and a second element having a second differential interface. The antenna system also includes polarization synthesis networks. Each of the polarization synthesis networks is coupled to the first differential interface of the first element of a respective dual linear polarization element of the dual linear polarization elements and the second differential interface of the second element of the respective the dual linear polarization element of the dual orthogonal linear polarization elements. Each of the polarization synthesis networks has a flat response for phase shift and amplitude over the ultra wide band.

In a further aspect, embodiments of the inventive concepts disclosed herein are directed to a method of providing phase coincidence for a pair of antenna elements. The pair of the antenna elements includes a first linear polarized element and a second linear polarized element in an array. The phase center of the first element and the second element are not physically aligned. The method includes providing a first phase control signal to a first phase shifter for the first element in a polarization network, and providing a first amplitude control signal for the first element to a first variable gain amplifier in the polarization synthesis network. The method also includes providing a second phase control signal to a second phase shifter for the second element in the polarization network, and providing a second amplitude control signal for the second element to a second variable gain amplifier in the polarization synthesis network. The first phase control signal, the second phase control signal, the first amplitude control signal, and the second amplitude control signal are provided to provide polarization and beam steering for the array. The first phase control signal and/or the second phase control signal are provided to align electrically the phase center of the first element and the second element.

In a further aspect, embodiments of the inventive concepts disclosed herein are directed to an antenna system. The antenna system includes an array of dual linear polarization elements. Each of the dual linear polarization elements includes a first element having a first differential interface and a second element having a second differential interface. The antenna system also includes polarization synthesis networks. Each of the polarization synthesis networks is coupled to the first differential interface of the first element of a respective the dual orthogonal linear polarization element of the dual linear polarization elements and the second differential interface of the second element of the respective the dual orthogonal linear polarization element of the dual orthogonal linear polarization elements. The polarization synthesis networks provide both beam steering and polarization synthesis for the array

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
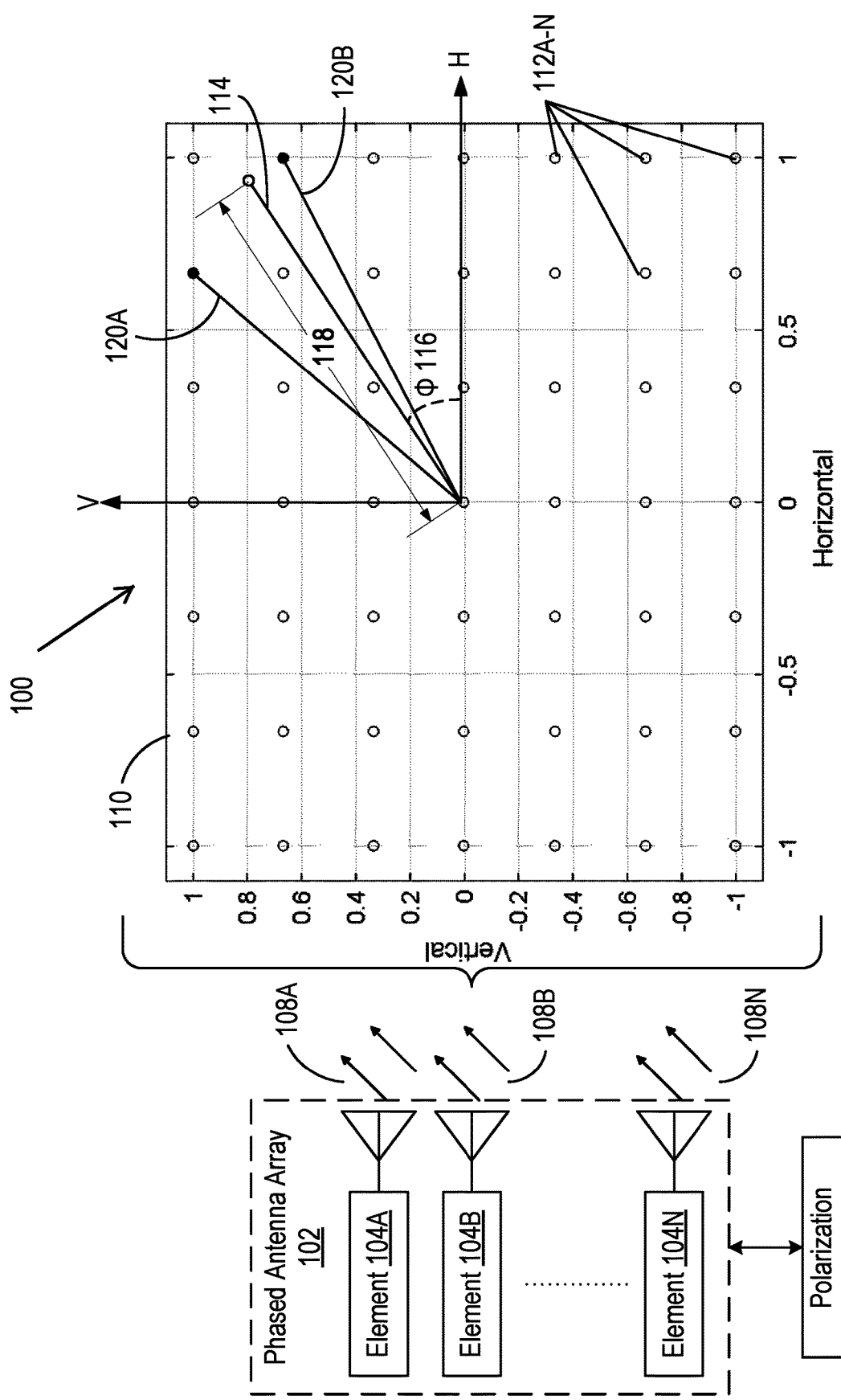
FIG. 1 is a schematic block diagram of an antenna system for providing beam steering and/or signal polarization in accordance with some embodiments of the inventive concepts disclosed herein.

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the schematic diagrams, but should be construed in accordance with the language in the claims.

Some embodiments of the inventive concepts disclosed herein are directed to an aperture (e.g., a UWB or higher wavelength scales array (WSA) AESA for use in the ultra-high frequency (UHF) to W Band. In some embodiments, systems and methods are directed to a UWB or higher antenna with polarization diversity. In some embodiments, systems and methods are directed to a polarization synthesis network (PSN) using miniature RF integrated circuit (IC) technology (e.g., silicon germanium (SiGe), RF complementary metal oxide semiconductor (CMOS), III-V and silicon-on-insulator (SOI) technologies) that provide high circuit density and digital, analog, RF, microwave and millimeter wave circuits within a common, monolithic IC technology. In some embodiments, the polarization synthesis network is incorporated at the element-level within the AESA architecture, and makes rapid, dynamic polarization adjustments at rates commensurate with AESA scan velocity profiles. The polarization synthesis network is size compatible (i.e. surface area) with one half wavelength by one half wavelength unit cell size (at the highest operating frequency) of the AESA in some embodiments. The polarization synthesis network is a standalone RFIC integrated with one or more low noise amplifiers, phase shifters/time delay units, transmit exciter circuits, etc. in some embodiments.

For purposes of reading the description of the various embodiments below, the following descriptions of the sections of the specification and their respective contents may be helpful:

Section A describes polarization control for electronically scanned arrays.

Section B describes arbitrary polarization in beamforming for electronically scanned arrays.

Section C describes ultra-wide band or higher active electronically scanned arrays having element-level synthesis.

A. Polarization Control for Electronically Scanned Arrays

In some aspects, embodiments of the inventive concepts disclosed herein are directed to a system, a method, a device, or an apparatus for controlling signal polarization. Radio applications, such as satellite communications, avionic communications, and cellular networks, may use RF signals of a specified polarization state to communicate. For example, $K_u$-band satellite data applications may specify two arbitrary linear polarizations (e.g., north-south or east-west polarization). In contrast, $K_u$-band satellite television applications may specify two circular polarizations. To maintain proper operation and communications for these radar applications, the cross-polarized RF signal (sometimes referred to as Xpol) is to be rejected due to frequency reuse. Failure to adequately reject the cross-polarized signal in receive mode may result in degradation of the signal-to-noise (SNR) of the received RF signals. In addition, failure to adequate reject the cross-polarized signal in transmit mode may lead to violation of operational standards for the radar application and may also be a violation of regulatory prerequisites or standards.

Polarization synthesis networks in phased arrays (also referred to as AESAs) may be used to generate RF signals with different polarizations. The polarization synthesis networks may receive inputs from corresponding individual radiators disposed in two linear polarizations (with both vertical and horizontal polarizations) in some embodiments. Using discrete variable gain amplifiers (VGAs) and phase shifters, the polarization synthesis networks may each apply a complex weight (e.g., amplitude and phase offset) onto the vertical and horizontal polarization input from the corresponding radiator. The output of the vertical and horizontal polarizations may then be summed. Based on the sums, the phased array may form RF signals with the vertical and horizontal polarizations set applied with the complex weights. It may be, however, difficult to use phased arrays to achieve the specified polarization state for the radio application, relative to other types of radio arrays. For example, a 20 decibel (dB) cross-polarization signal rejection may entail 2° of phase control and 0.25 of amplitude control among the individual polarization synthesis networks. The synthetization of polarization states may depend on a phase balance and an amplitude between the vertical and horizontal polarization inputs before summation. As such, the challenge in achieving the specified polarization state for the radio application may be exacerbated with the use of discrete VGAs, because the discrete VGAs may have a finite number of achievable polarization states. The quantization error due to the finite number of polarization states may result in a limit to the cross-polarization rejection achievable with the polarization synthesis networks of the phased array. One technique to alleviate or reduce the quantization error may include using additional polarization synthesis networks with discrete VGAs and phase shifters to increase the number of achievable polarization states. This technique, however, may result in ever higher complexity in hardware components in the phased array and greater number of bits for the discrete VGAs in the polarization synthesis networks to represent the achievable polarization states.

To address the technical challenges arising from polarization synthesis networks and phased arrays, a polarization controller may take advantage of the averaging effect among the outputs of the polarization synthesis networks across the phased array. The polarization controller may set the complex weights of the discrete VGAs and the phase shifters in individual polarization synthesis networks to achieve the specified polarization state for the radio application with a target amplitude and a target phase. To that end, the polarization controller may set the variable gain and the phase offset of at least a first polarization synthesis network (and corresponding antenna array element(s)) to a first polarization state, and may set the variable gain and the phase offset of at least a second polarization synthesis networks (and corresponding antenna array element(s)) to a second polarization state. The first polarization state may have an amplitude closest to the target amplitude among the finite number of achievable polarization states for a phase greater than the target phase. The second polarization state may have an amplitude closest to the target amplitude among the finite number of achievable polarization states for a phase less than the target phase. More than two polarization synthesis networks may be used to generate multiple polarization states about the target amplitude and phase. When combined, the polarization states may average out to the specified polarization state for the radio application. In this manner, the polarization controller in conjunction with the polarization synthesis networks of the phased array may significantly reduce the amount of complexity of hardware components. With lower complexity of hardware components, the polarization controller may use lower number of bits for the discrete VGAs across the polarization synthesis networks, as compared to the situation prior to reducing the complexity of the hardware components. In some embodiments, the polarization controller may attain high accuracy with the specified polarization state for the radio application.

The manufacturing techniques, devices and configurations described in 17-CR-00515, "Wavelength Scaled Array Layout Optimization", U.S. patent application Ser. No. 15/825,711, "Polarization Control For Electronically Scanned Arrays," U.S. patent application Ser. No. 16/021,784, filed Jun. 28, 2018, "Circularly Symmetric Tightly Coupled Dipole Array," U.S. patent application Ser. No. 15/972,608, filed May 7, 2018, U.S. patent application Ser. No. 15/160,959, U.S. patent application Ser. No. 15/972,608, filed Jun. 28, 2018, U.S. patent application Ser. No. 16/021,784, U.S. patent application Ser. No. 16/147,252 filed on Sep. 28, 2018, and U.S. patent application Ser. No. 16/123,854 filed on Sep. 6, 2018 can be utilized in some embodiments; each of the above listed applications is incorporated herein by reference in its entirety and assigned to the assignee of the present application.

Referring now to FIG. 1, an antenna system 100 is configured to control signal polarization. The system 100 includes a phased antenna array 102 with a set of elements 104A-N and a polarization controller 106 in some embodiments. Each element 104A-N (which can include a polarization synthesis network) can include an antenna element to receive and/or transmit an RF signal 108A-N. In generating or receiving each RF signal 108A-N, the polarization controller 106 sets a pair of complex weights for a pair of discrete variable gain amplifiers (VGAs) and phase shifters of the respective element 104A-N in some embodiments. The polarization controller 106 may apply the complex weights via the pair of discrete variable gain amplifiers (VGAs) and phase shifters of the respective element 104A-N to result in a polarization state of the RF signal 108A-N. The polarization state may be defined in a polarization plane 110. The polarization plane 110 may be decomposed into two orthogonal vectors, a vertical polarization axis (V) and a horizontal polarization axis (H). In each element 104A-N, a complex weight applied via one discrete VGA and phase shifter may be used to form the polarization along the vertical polarization axis. In addition, another complex weight applied via the other discrete VGA and phase shift may be used to form the polarization along the horizontal axis.

As the polarization state of the RF signal 108A-N is set by the polarization controller 106 configuring the discrete VGAs and phase shifters of the respective element 104A-N, the polarization plane 110 may have a set of discrete polarization states 112A-N. Using the set of discrete polarization states 112A-N, the phase antenna array 102 may form a summed RF signal with a target polarization state 114 that has a target polarization angle (1) 116 and a target amplitude 118. The polarization controller 106 may set the pair of complex weights for the discrete VGAs and phase shifters of the first element 104A (for instance) to result in a first polarization state 120A. The first polarization state 120A may be one of the set of discrete polarization states 112A-N. The first polarization state 120A may have an amplitude closest to the target amplitude 118 of the target polarization state 114 with a polarization angle greater than the target polarization angle 116. The polarization controller 106 may set the pair of complex weights for the discrete VGAs and phase shifters of the second element 104B (for instance) to result in a second polarization state 120B. The second polarization state 120B may be one of the set of discrete polarization states 112A-N. The second polarization state 120B may have an amplitude closest to the target amplitude 118 of the target polarization state 114 with a polarization angle less than the target polarization angle 116. The summation of signals corresponding to the polarization states 120A and 120B set by the two example elements 104A and 104B (among other antenna elements 104 for example) may result in a signal with approximately the target polarization state 114. As the number of elements 104 transmitting in each of the polarization states 120A and 120B increases, the summation of their signals or transmissions can sometimes approximate closer to the target polarization state 114.

Figure 2:
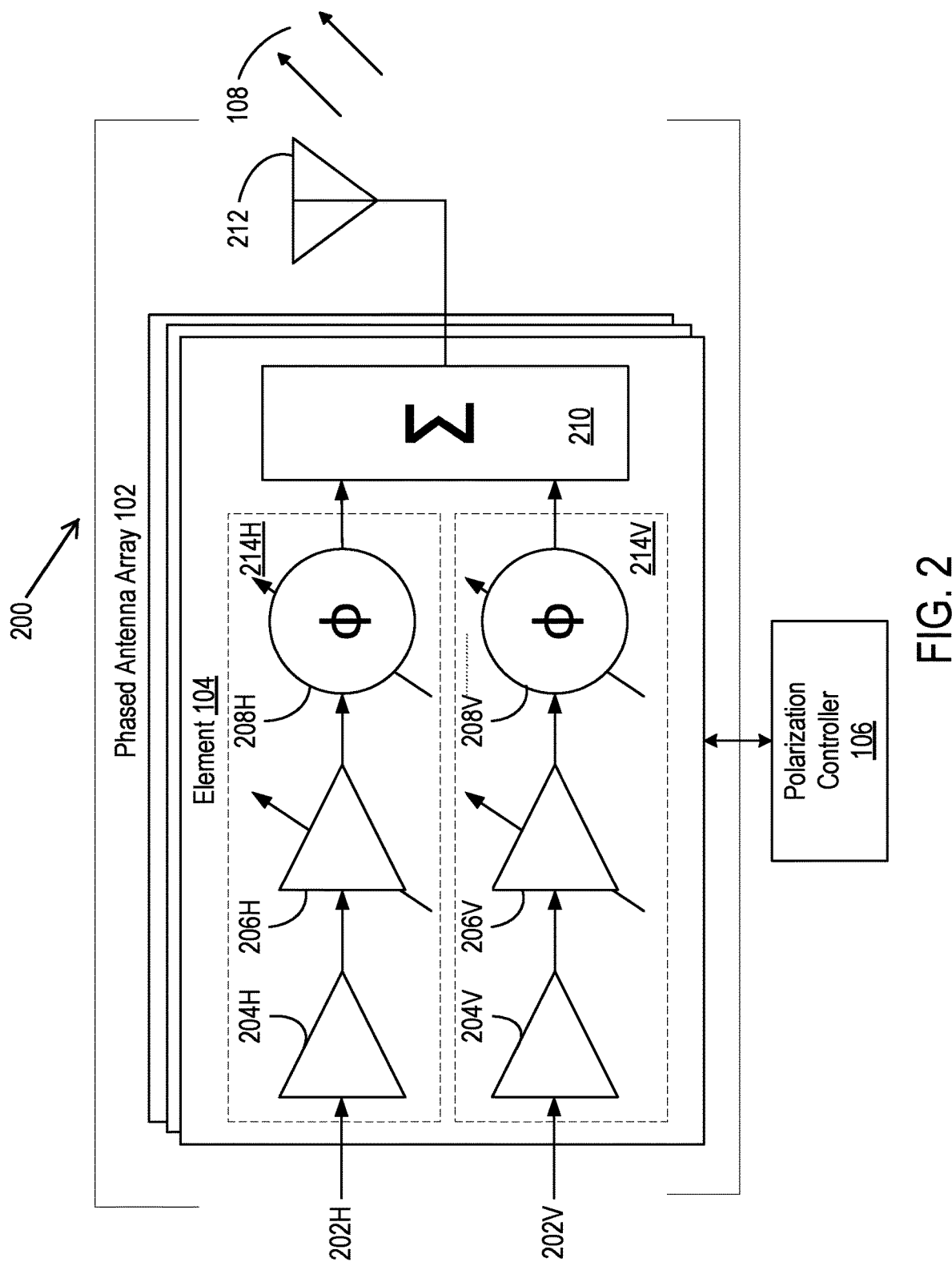
FIG. 2 is a schematic block diagram of an element system for controlling signal polarization and/or beam steering for the antenna system illustrated in FIG. 1 in accordance with some embodiments of the inventive concepts disclosed herein.

Referring now to FIG. 2, a system 200 is configured to control signal polarization. The system 200 includes the phased array antenna 102 with the set of elements 104A-N (hereinafter generally referred to as element 104), and the polarization controller 106 in some embodiments. The element 104 is coupled to an antenna element 112 of the phased array antenna 102 and includes a horizontal port 202H, a vertical port 202V, a horizontal non-linear amplifier 204H, a vertical non-linear amplifier 204V, a horizontal variable-gain amplifier (VGA) 206H, a vertical digital VGA 206V, a horizontal digital phase shifter 208H, a vertical digital phase shifter 208V, a summation unit 210 or a combiner for signal reception, to generate and transmit or receive a signal 108A-N (generally referred to as signal 108) on the antenna 212. The system 200 is described below for transmission of RF signals, and system 200 can include a receive path using the components described above in proper receive orientation. The terms vertical and horizontal refer to any linear polarization orientation in some embodiments. The vertical channel or port 202V, the horizontal non-linear amplifier 204H, and the horizontal digital VGA 206H form a horizontal chain 214H of the element 104. The vertical channel or port 202V, the vertical non-linear amplifier 204V, the vertical digital phase shifter 208V form a vertical channel 214V of the element 104. The polarization controller 106 is communicatively coupled with each element 104 of the phased antenna array 102.

Each of the components listed above may include at least one processor. The processors may include a microprocessor unit, an application-specific integrated circuit (ASIC), and a field-programmable gate array (FPGA), among others. The processors may also be a multi-core processor or an array of processors. The memory in each above mentioned device or component may include electronic, optical, magnetic, or any other storage device capable of relaying or providing the processor with program instructions. The memory may include, for example, include a floppy disk, CD-ROM, DVD, magnetic disk, memory chip, Static random access memory (SRAM), Burst SRAM or SynchBurst SRAM (BSRAM), Dynamic random access memory (DRAM), Ferroelectric RAM (FRAM), NAND Flash, NOR Flash, and Solid State Drives (SSD), among others, or any combination thereof. The program instructions may include code from any programing language, such as C, C++, C#, Java, JavaScript, Perl, HTML, XML, Python, Visual Basic, et cetera, or any combination thereof.

In each element 104, the horizontal non-linear amplifier 204H may receive a projection of the signal on a horizontal plane (hereinafter referred to as a horizontal component) as an input via the horizontal port 202H. The vertical non-linear amplifier 204V may receive a projection of the signal on a vertical plane (hereinafter referred to as the vertical component) as an input via the vertical port 202V. The horizontal component may have an initial amplitude and an initial phase along the horizontal axis (H) defined by the polarization plane 110. In some embodiments, the horizontal component may be an analog signal. In some embodiments, the horizontal component may include a digital signal (e.g., a pulse amplitude modulated signal). The vertical component may have an initial amplitude and an initial phase along the vertical axis (V) defined by the polarization plane 110. In some embodiments, the vertical component may be an analog signal. In some embodiments, the vertical component may include a digital signal (e.g., a pulse amplitude modulated signal).

The horizontal non-linear amplifier 204H may be a low-noise amplifier, and may increase or decrease an amplitude of the incoming horizontal component, and can be used to remove distortions (e.g., harmonic or intermodulation) from the incoming horizontal component. The output of the horizontal non-linear amplifier 204H may be provided to the horizontal digital VGA 206H. The vertical non-linear amplifier 204V may be a low-noise amplifier, may increase or decrease an amplitude of the incoming vertical component, and can be used to remove distortions (e.g., harmonic or intermodulation) from the incoming vertical component. The output of the vertical non-linear amplifier 204V may be provided to the vertical digital VGA 206V.

The horizontal digital VGA 206H may be a translinear amplifier or an exponential amplifier, and may include an analog-to-digital converter (ADC) to convert the horizontal component from an analog signal to a digital signal. The horizontal digital VGA 206H may have discrete amplitude control to increase or decrease the amplitude of the horizontal component to one of a set of quantized amplitudes as configured by the polarization controller 106. Each quantized amplitude may be at a defined interval (e.g., 0.10 dB, 0.25 dB, and 0.5 dB) from another quantized amplitude. The output of the horizontal digital VGA 206H may be provided to the horizontal digital phase shifter 208H. The vertical digital VGA 206V may be a translinear amplifier or an exponential amplifier, and may include an analog-to-digital converter (ADC) to convert the vertical component from an analog signal to a digital signal. The vertical digital VGA 206V may have discrete amplitude control to increase or decrease the amplitude of the vertical component to one of a set of quantized amplitudes as configured by the polarization controller 106. Each quantized amplitude may be at a defined interval (e.g., 0.10 dB, 0.25 dB, and 0.5 dB) from another quantized amplitude. The output of the vertical digital VGA 206V may be provided to the vertical digital phase shifter 208V.

The horizontal digital phase shifter 208H may be a switched-line phase shifter, a loaded-line phase shifter, a reflection line phase shifter, a quadrature phase shifter, among others. The horizontal digital phase shifter 208H may have discrete phase control to increase or decrease a phase of the horizontal component to one of a set of quantized phases as configured by the polarization controller 106. Each quantized phase may be at defined interval (e.g., 5°, 22.5°, and) 45° from another quantized phase. The output of the horizontal digital phase shifter 208H may be provided to the summation unit 210. The vertical digital phase shifter 208V may be a switched-line phase shifter, a loaded-line phase shifter, a reflection line phase shifter, a quadrature phase shifter, among others. The vertical digital phase shifter 208V may have discrete phase control to increase or decrease a phase of the vertical component to one of a set of quantized phases as configured by the polarization controller 106. Each quantized phase may be at defined interval (e.g., 5°, 22.5°, and 45°) from another quantized phase. The output of the vertical digital phase shifter 208V may be provided to the summation unit 210. In some embodiments, the phase shifters 208 H and 208 V are in general relatively narrow band in terms of flat phase vs. operational frequency, impedance match and insertion loss. A vector modulator phase shifter can be used for superior UWB performance.

The summation unit 210 may receive the output from the horizontal chain 214H and the vertical chain 214V. The summation unit 210 may perform a summation of the outputs to generate a resultant signal 108 to transmit via the antenna 212 of the respective element 104. The resultant signal 108 may have an amplitude dependent on the amplitude of the horizontal component from the horizontal channel 214H and the amplitude of the vertical component from the vertical channel 214V. The resultant signal 108 may also have a phase dependent on the phase of the horizontal component from the horizontal channel 214H and the phase of the vertical component from the vertical channel 214V. The resultant signal 108 may also have a polarization state dependent on the amplitudes of the horizontal component and the vertical component, and the phases of the horizontal component and the vertical component configured by the polarization controller 106. In some embodiments, the polarization state of the resultant signal may include a linear polarization state, a circular polarization state, or an elliptical polarization state. For example, the complex weights specified by the polarization controller 106 of "1" for the amplitude of the horizontal component and "0" for the amplitude of the vertical component with in-phase 45° degree shift may result in the linear polarization state for the resultant signal 108. On the other hand, and by way of illustration, the complex weights specified by the polarization controller 106 of "1" for the amplitude of the horizontal component and "1" for the amplitude of the vertical component with quadrature phase shift may result in a circular polarization state for the resultant signal 108.

Because both the digital VGAs 206H and 206V and the digital phase shifters 208H and 208V have discrete control, the number of possible polarization states 112A-N generated by a single element 104 may be finite. In addition, each polarization state 112A-N generated by the element 104 may be at a defined spacing from one another (e.g., as depicted in the polarization plane 110 of FIG. 1). As such, the target polarization state 114 may not correspond to any one particular possible polarization state 112A-N. To attain the target polarization state 114 using the elements 104 of the phased antenna array 102, the polarization controller 106 may configure the digital VGAs 206H and 206V and the digital phase shifters 208H and 208V. Details of the functionalities of the polarization controller 106 in relation to the various components of the elements 104 of the phased antenna array 102 are explained herein below.

With reference to FIGS. 1 and 2, the polarization controller 106 may receive, select, or otherwise identify the target polarization state 114 for the phased antenna array 102. The target polarization state 114 may have a target polarization angle 116 and a target amplitude 118. The target amplitude 118 may be decomposed into, or represented by a horizontal amplitude on the horizontal axis (H) and a vertical amplitude on the vertical axis (V) of the polarization plane 110, for instance. The target polarization angle 116 may be defined relative to the horizontal axis (H) or the vertical axis (V) of the polarization plane 110, or relative to any other axes. The target polarization state 114 may be a linear polarization state, a circular polarization state, or an elliptical polarization state.

In some embodiments, the polarization controller 106 may select the target polarization state 114 based on a specified radio communication application for instance. The target polarization state 114 may be specified by the radio communication application. For example, $K_u$-band satellite data applications may specify two arbitrary linear polarizations (e.g., north-south or east-west polarization). In contrast, $K_u$-band satellite television applications may specify two circular polarizations. In some embodiments, the polarization controller 106 may receive the target polarization state 114 via a user interface (e.g., via user input). For example, a system administrator may use a graphical user interface and peripheral devices (e.g., keyboard) to enter the target polarization angle 116 and the target amplitude 118 for the target polarization state 114.

The polarization controller 106 may determine, select, or otherwise identify a subset of polarization states 120A-N from the set of discrete polarization states 112A-N, for use in generating, forming or approximating the target polarization state 114 with the phased antenna array 102. As explained above, the set of discrete polarization states 112A-N may be the polarization states achievable by the elements 104 of the phased antenna array 102 due to the discrete control by the digital VGAs 206H and 206V and discrete phase shifters 208H and 208V. The subset of polarization states 120A-N may include at least two of the discrete polarization states 112A-N. Each polarization state 120A-N may be a linear polarization state, a circular polarization state, or an elliptical polarization state. In some embodiments, the polarization controller 106 may identify the subset of polarization states 120A-N closest in amplitude and phase to the target polarization state 114 from the set of discrete polarization states 112A-N. In some embodiments, the polarization controller 106 may determine or identify the absolute amplitude of the target polarization state 114. The absolute amplitude may correspond to a non-negative value of the target amplitude 118. In some embodiments, the polarization controller 106 may determine or identify the absolute amplitude of each discrete polarization state 112A-N. The absolute amplitude may correspond to a non-negative value of the amplitude of the discrete polarization state 112A-N.

To identify the subset of discrete polarization states 112A-N, the polarization controller 106 may compare the target amplitude 118 (or the absolute amplitude) to the amplitudes of the set of discrete polarization states 112A-N. In performing the comparing, the polarization controller 106 may calculate or determine a difference between the target amplitude 118 and the amplitude of the discrete polarization state 112A-N for each of at least some of the discrete polarization states 112A-N. Based on the comparison, the polarization controller 106 may identify a subset of the discrete polarization states 112A-N closest in amplitude to the target amplitude 118 of the target polarization state 114. In some embodiments, the polarization controller 106 may apply a nearest neighbor search (NNS) to identify the subset of discrete of discrete polarization states 112A-N. In some embodiments, the polarization controller 106 may select or identify the subset of the discrete polarization states 112A-N with the lowest n differences between the amplitude of the discrete polarization state 112A-N and the target amplitude 118 (n≥2).

The polarization controller 106 may identify a number of discrete polarization states 112A-N with polarization angles closest to the target polarization angle 116. For instance, with the identification of the subset of discrete polarization states 112A-N with amplitudes closest to the target amplitude 118, the polarization controller 106 may identify another subset of discrete polarization states 112A-N with polarization angles closest to the target polarization angle 116. The discrete polarization states 112A-N with polarization angles closest to the target polarization angle 116 may be selected or identified from the subset of discrete polarization states 112A-N with amplitudes closest to the target amplitude 118. In some embodiments, the polarization controller 106 may determine or identify the target polarization angle 116 of the target polarization state 114. In some embodiments, the polarization controller 106 may identify polarization angles of each of the subset of the discrete polarization states 112A-N with amplitudes closest to the target amplitude 118. For each discrete polarization state 112A-N (e.g., of the discrete polarization states 112A-N, or of the subset of the discrete polarization states 112A-N with amplitudes closest to the target amplitude 118), the polarization controller 106 may compare the polarization angle with the target polarization angle 116. In some embodiments, the polarization controller 106 may calculate or determine a difference between the polarization angle for the discrete polarization state 112A-N and the polarization angle 116. Based on the comparison, the polarization controller 106 may identify the subset of the discrete polarization states 112A-N with polarization angles closest to the target polarization angle 116 of the target polarization state 114. In some embodiments, the polarization controller 106 may apply a nearest neighbor search (NNS) to identify the subset of discrete of discrete polarization states 112A-N. In some embodiments, the polarization controller 106 may select or identify the subset of the discrete polarization states 112A-N with the lowest n differences between the polarization angle of the discrete polarization state 112A-N and the target polarization angle 116 (n≥2).

From discrete polarization states 112A-N with amplitudes closest to the target amplitude 118 and polarization angles closest to the target polarization angle 116 (e.g., selected or identified as described above, or otherwise), the polarization controller 106 may identify a subset of polarization states 120A-N to generate, synthesize, implement, form or produce the target polarization state 114, using the phased antenna array 102. In some embodiments, the polarization controller 106 may select or identify a first subset from the identified discrete polarization states 112A-N with polarization angles greater than the target polarization angle 116. The first subset may include one or more of the discrete polarization states 112A-N with polarization angles greater than the target polarization angle 116. For example, the polarization controller 106 may identify the first polarization state 120A from the set of discrete polarization states 112A-N. The first polarization state 120A may have an amplitude closest to the target amplitude 118 with a polarization angle greater than the target polarization angle 116. In some embodiments, the polarization controller 106 may select or identify a second subset from the identified discrete polarization states 112A-N with polarization angles less than the target polarization angle 116. The first subset may include one or more of the discrete polarization states 112A-N with polarization angles less than the target polarization angle 116. For example, the polarization controller 106 may identify the second polarization state 120B from the set of discrete polarization states 112A-N. The second polarization state 120B may have an amplitude closest to the target amplitude 118 with a polarization angle less than the target polarization angle 116.

In certain embodiments, the polarization controller 106 may determine a set of average polarization states using the subset of discrete polarization states 112A-N with amplitudes closest to the target amplitude 118 and polarization angles closest to the target polarization angle 116. The average polarization state may approximate the target polarization state 114 in the target polarization angle 116 and the target amplitude 118. In some embodiments, the polarization controller 106 may select or identify one or more combinations of polarization states from the subset of discrete polarization states 112A-N. Each combination may include at least two polarization states 120A-N from the subset of identified discrete polarization states 112A-N. For each combination, the polarization controller 106 may calculate or determine the average polarization state by spatially adding and averaging the selected discrete polarization states 112A-N. The average polarization state may have an average amplitude and an average polarization angle determined based on the amplitudes and the polarization angles of the selected or combined polarization states 120A-N. It should be noted that the average amplitude and/or the average polarization angle may be offset from the amplitude and/or polarization states of the discrete polarization states 112A-N. For each combination, the polarization controller 106 may compare the average polarization state and the target polarization state 114. In some embodiments, the polarization controller 106 may calculate or determine a difference in spatial position in the polarization plane 110 between the average polarization state and the target polarization state 114. Based on the comparison, the polarization controller 106 may identify or select the average polarization state closest in approximation to the target polarization state 114. In some embodiments, the polarization controller 106 may select or identify the average polarization state with the lowest difference from the target polarization state 114 in the polarization plane 110. The polarization controller 106 may identify the constituent discrete polarization angles or states 120A-N for the combination corresponding to the average polarization state identified as nearest in approximation to the target polarization state 114, and may select this combination of polarization states to achieve or approximate the target polarization state 114.

From the phased antenna array 102, the polarization controller 106 may select subsets of elements 104 to generate the one or more signals 108 with the selected polarization states 120A-N to provide the target polarization state 114. The resultant signal 108 may provide a polarization state equal or approximate to the target polarization state 114 in the target polarization angle 116 and the target amplitude 118. In some embodiments, the selection of the elements 104 may be in accordance to the following formula:

$$\frac{|P_{Goal} \cdot P_1|}{|P_{Goal}|} = \% \text{ of } P_1 \text{ elements}$$

$$\frac{|P_{Goal} \cdot P_2|}{|P_{Goal}|} = \% \text{ of } P_2 \text{ elements}$$

where $P_{Goal}$ denotes the target polarization state 114, $P_1$ denotes the selected polarization state 120A-N with polarization angles greater than the target polarization angle 116, $P_2$ denotes the selected polarization state 120A-N with polarization angle less than the target polarization angle, % of $P_1$ elements refers to the percentage of elements 104 for generating the polarization state 120A or $P_1$, and $P_2$ elements refers to the percentage of elements 104 for generating the polarization state 120B or $P_2$.

To select the subsets of elements 104, the polarization controller 106 may calculate, determine, or perform a dot product of the target polarization state 114 and each polarization state 120A-N to obtain a magnitude value. The dot product (also referred to as a scalar product) may correspond to a magnitude of a scalar projection of the polarization state 120A-N onto the target polarization state 114. In some embodiments, the polarization controller 106 may calculate or determine an absolute value of the dot product. The polarization controller 106 may determine, calculate, or otherwise obtain a ratio of the magnitude value for each polarization state 120A-N to the target amplitude 118. In accordance with the ratios between the magnitude value for each polarization state 120A-N and the target amplitude 118, the polarization controller 106 may determine a percentage or a subset number of elements 104 from the phased antenna array 102 for the polarization state 120A-N. Each subset number of elements 104 may correspond to the polarization state 120A-N. In some embodiments, the polarization controller 106 may determine a first subset number of elements 104 for providing the resultant signal 108 with the polarization state 120A based on the ratio. The polarization controller 106 may also determine a second subset number of elements 104 exclusive from (or non-overlapping with) the first subset for providing the resultant signal 108 with the polarization state 120B based on the ratio.

With the determination of the subset numbers of elements 104, the polarization controller 106 may select the subsets of elements 104 to generate and provide the resultant signals 108 with the selected polarization states 120A-N. The polarization controller 106 may identify the subset number of elements 104 for each polarization state 120A-N. In some embodiments, the polarization controller 106 may select subsets of elements 104 for the selected polarization states 120A-N to be partly spatially interspersed or interleaved based on the number of elements 104. In some embodiments, the polarization controller 106 may select a first subset of elements 104 for the first polarization state 120A and a second subset of elements 104 for the second polarization state 120B based on the number for each polarization state 120A and 120B. The first subset and the second subset of elements 104 may be interleaved or interspersed, with the first subset of elements 104 to provide a signal 108A with the first polarization state 120A, and with the second subset of elements 104 to provide a signal 108B with second polarization state 120B. In some embodiments, the polarization controller 106 may randomly select elements to form the two subsets of elements 104 to provide the signals 108 with the polarization states 120A and 102B, based on the determined number of elements for each polarization state 120A, 102B. In some embodiments, the polarization controller 106 may select a first subset of elements 104 for the first polarization state 120A and a second subset of elements 104 for the second polarization state 120B based on the number of elements determined for each polarization state 120A, 120B. The first subset and the second subset of elements 104 may be randomly selected or partitioned from available elements in the phased antenna array 102.

The polarization controller 106 may concurrently form the signals 108A, 108B via the antennae 212 of the subsets of elements 104. The resultant signal 108 may provide the average polarization state closest in approximation to the target polarization state 114. For each selected (or component) polarization state 120A, 120B, the polarization controller 106 may concurrently form the signals 108A, 108B with the polarization state 120A, 120B using the antennae 212 of the corresponding subset of elements 104. Signals (e.g., 108A, 108B) formed with various polarization states (e.g., 120A, 120B) may be considered to be concurrently formed when formed within 1 second, or up to 1 minute of one another, for instance. In some embodiments, the polarization controller 106 may concurrently form a first signal 108A with the polarization state 120A using the antennae 212 of first subset of elements 104, and form a second signal 108B with the polarization state 120B using the antennae 212 of the second subset of elements 104.

In forming the resultant signals 108, the polarization controller 106 may configure the digital VGAs 206H and 206V and the digital phase shifters 208H and 208V of each element 104. In accordance with the selection of the subsets of the elements 104, the polarization controller 106 may set the complex weights to apply via the digital VGAs 206H and 206V and the digital phase shifters 208H and 208V in each element 104. For each element 104, the polarization controller 106 may identify which of the polarization states 120A-N the element 104 is to produce or generate based on the selection. With the identification of the polarization state 120A, 120B, the polarization controller 106 may identify the amplitude and the polarization angle of the polarization state 120A-N (e.g., to configure each corresponding element 104). In some embodiments, the polarization controller 106 may calculate, determine, or identify a horizontal component and a vertical component of the amplitude of the polarization state 120A-N. In some embodiments, the polarization controller 106 may calculate or determine, or identify the polarization angle of the polarization state 120A-N. The polarization angle may be relative to the vertical axis (V) and/or the horizontal axis (H) on the polarization plane 110 for example.

Using the amplitude and the polarization angle of the polarization state 120A-N, the polarization controller 106 may determine or set the complex weights for the digital VGAs 206H and 206V and the digital phase shifters 208H and 208V. The complex weight may include an amplitude and phase for each of the horizontal axis (H) and the vertical axis (V). In some embodiments, the polarization controller 106 may set the complex weights using a binary signal to provide or relay to each element 104 of the phased antenna array 102. The binary signal may include a sequence of bits representing the complex weights to be applied at the digital VGAs 206H and 206V and the digital phase shifters 208H and 208V. In some embodiments, the polarization controller 106 may set the amplitude of the complex weight for the horizontal axis (H) for the horizontal VGA 206H based on the horizontal component of the amplitude of the polarization state 120A-N. In some embodiments, the polarization controller 106 may set the phase of the complex weight relative the horizontal axis (H) for the horizontal digital phase shifter 208H based on the phase of the polarization state 120A-N. In some embodiments, the polarization controller 106 may set the amplitude of the complex weight for the vertical axis (H) for the vertical VGA 206V based on the vertical component of the amplitude of the polarization state 120A-N. In some embodiments, the polarization controller 106 may set the phase of the complex weight relative the vertical axis (V) for the vertical digital phase shifter 208V based on the phase of the polarization state 120A-N. In this manner, when the output signal of the horizontal chain 214H and the vertical chain 214V are provided to the summation unit 210, the antenna 212 of the element 104 may generate the signal 108 with the polarization state 120A-N. The polarization states 120A-N (e.g., 120A, 120B) of the signals 108 generated across the elements 104 of the phase antenna array 102 may average out to an approximation of the target polarization state 114.

Figure 3:
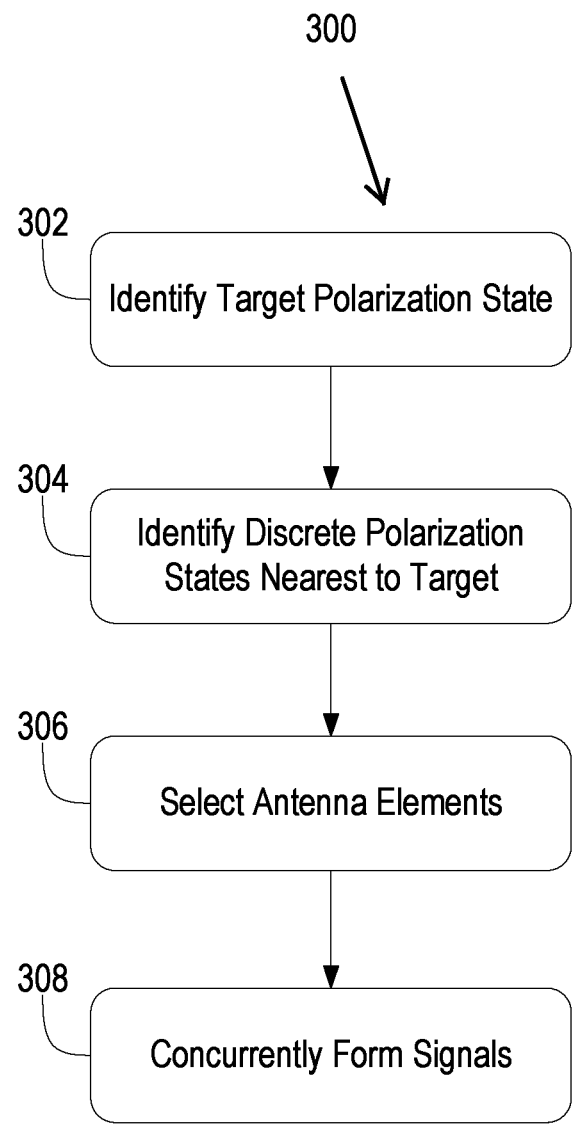
FIG. 3 is a flow diagram of operations for controlling signal polarization in accordance with some embodiments of the inventive concepts disclosed herein.

Referring now to FIG. 3, depicted is a flow 300 of operations for controlling signal polarization is performed or implemented using any of the above mentioned components or devices of FIGS. 1 and 2, such as the polarization controller 106. In brief overview, a polarization controller may identify a target polarization state (an operation 302). The polarization controller may identify discrete polarization states nearest to the target polarization state (an operation 304). The polarization controller may select antenna elements (an operation 306). The polarization controller may concurrently form signals (an operation 308).

In further detail, a polarization controller may identify a target polarization state (operation 302). The polarization controller may select or identify the target polarization state based on a specified radio communication application. Various radio communication applications may specify different target polarization states, such as linearly polarized, circularly polarized, or elliptically polarized. The target polarization state (e.g., corresponding to a given time instance) specified by the radio communication application may include a target amplitude and a target polarization angle (e.g., corresponding to the given time instance).

The polarization controller may identify discrete polarization states nearest to the target polarization state (operation 304). The discrete polarization states may be those polarization states achievable using a phased antenna array with discrete control over amplitude and polarization angle. The polarization controller may identify a subset of the discrete polarization states with amplitudes and polarization angles closest to the target amplitude and the target polarization angle of the target polarization state. Out of the identified discrete polarization states for instance, the polarization controller may select at least one discrete polarization state with a polarization angle less than the target polarization angle. The polarization controller may also identify at least one discrete polarization state with a polarization angle greater than the target polarization angle.

The polarization controller may select antenna elements (operation 306). The polarization controller may determine a number of subset antenna elements to provide each identified discrete polarization state of the subset. For each discrete polarization state, the polarization controller may calculate a dot product of the target polarization state and the discrete polarization state to obtain a magnitude value. The polarization controller may calculate a ratio of the magnitude value for the discrete polarization state and the target amplitude of the target polarization state. Using the radio, the polarization controller may determine number of subset antenna elements to provide each of the identified discrete polarization states. The polarization controller may select the antenna elements to provide the signal with the discrete polarization state based on the number. The antenna elements may be interspersed or randomly arranged.

The polarization controller may concurrently form signals (operation 308). Based on the selection of antenna elements, the polarization controller may concurrently form the signals for each of the discrete polarization states to provide an polarization state approximate to the target. The polarization controller may set the complex weights to apply via horizontal and vertical digital VGAs and digital phase shifter of each antenna element. The setting of the complex weights may be based on the amplitude and the polarization angle of the discrete polarization state to be provided by the antenna element.

B. Arbitrary Polarization in Beamforming for Electronically Scanned Arrays

Antenna elements of an array can be configured to transmit or receive with a given polarization, such as linear polarization (vertical, horizontal, or some combination) and elliptical polarization, including right hand and left hand circular (RHC, LHC). For example, dynamic polarization configurations are advantageous when polarization can change with relative platform orientation or signal reflection, when polarization may be unknown when searching for signals not yet identified, and/or when a receiver has no control or limited control of antenna polarization. This may apply to transmit as well as receive. Furthermore, dynamic polarization configurations polarization is advantageous when polarization is used for isolation from signals at some other polarization and the ability to adjust polarization can improve signal strength and isolation from interference. A beamforming transceiver that operates with arbitrary polarization is advantageous. In some embodiments, the antenna system is configured with multi-beam capability and independent control of polarization.

Figure 4:
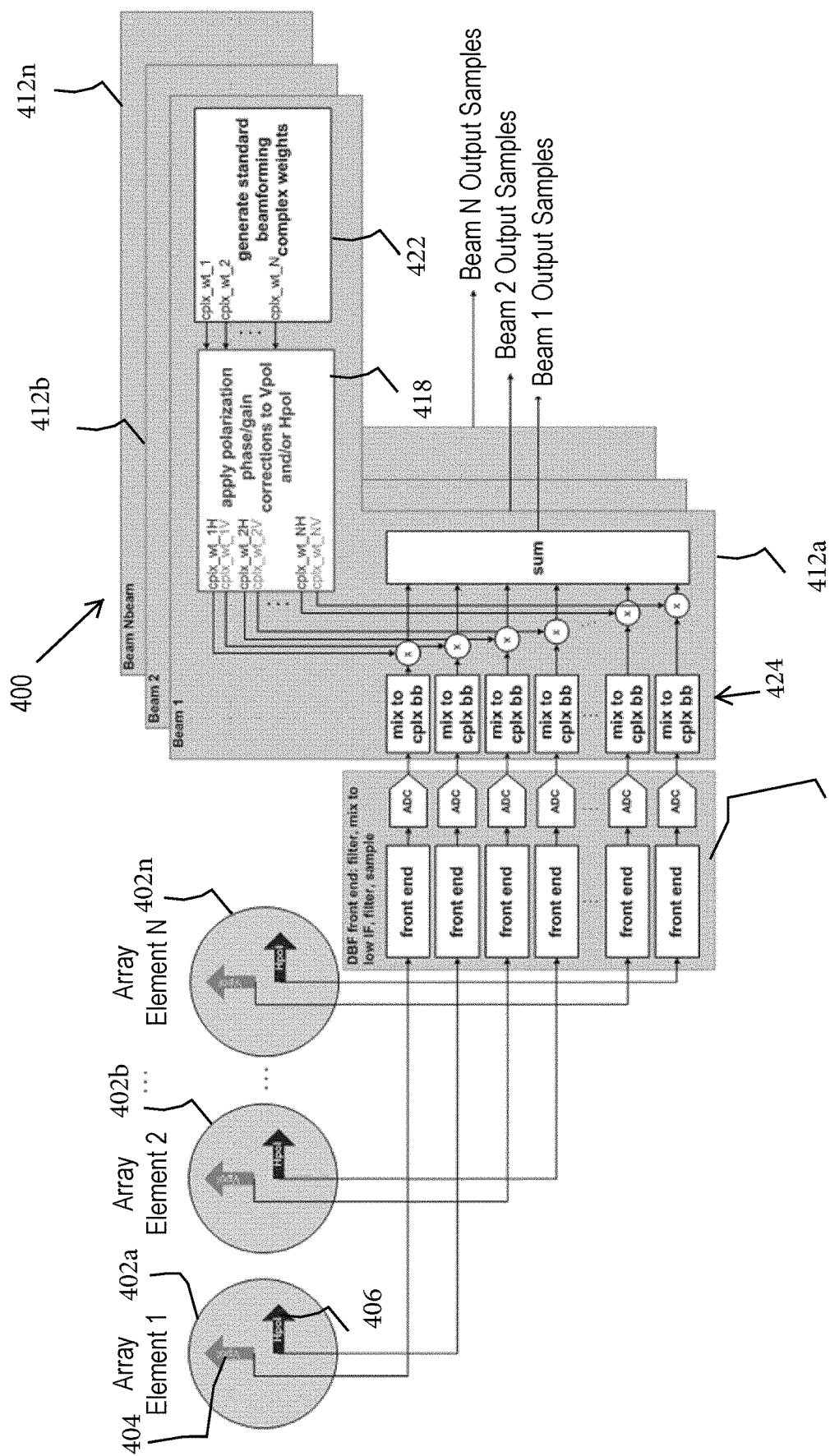
FIG. 4 is a schematic block diagram of an antenna system for providing arbitrary polarization in beamforming for electronically scanned arrays in accordance with some embodiments of the inventive concepts disclosed herein.

Referring now to FIG. 4, an antenna system 400 is configured for arbitrary polarization in beamforming in an AESA. In the system 400, each antenna element 402a-n has two linear polarization elements 404 and 406 (e.g., a horizontal polarization (Hpol) elements and a vertical polarization (Vpol) element). The Hpol element may use only the front end chains 408 connected to Hpol of the elements 402a-n, and the Vpol element may use only the front end chains 408 connected to Vpol of the elements 402a-n. Arbitrary linear polarization is accomplished by applying different gain to the Hpol signals than to the Vpol signals, using beam formers 412a-n for example, equal weight would provide 45° linear polarization. Circular polarization may be achieved when the Hpol and Vpol signals are combined with a 90° offset on one of them (complex beam weights on Hpol or Vpol multiplied by +/−i). Changing right/left hand may result from either changing the sign of the rotation (+90° to −90°), or applying the rotation to the other polarization (e.g. Vpol rather than Hpol). Elliptical polarization may be the same as circular, but with a different magnitude on beam weights for Hpol versus Vpol.

With multiple independent beams, each beam may have a separate set of complex weights used to combine the signals. Each beam may incorporate polarization into its weights, allowing independent polarization control per beam. For example, the beam formers 412a-n embodied as digital beamformers (DBFs) such as provided by an ACT module may have multiple beams, or beam formers 412a-n embodied as analog beamformers (ABFs) may have multiple beams with multiple phase/gain control devices per element/polarization. The arrays at commercial timescale (ACT) module can include a receiver DBF and a transmitter ABF. The hardware may also include dual polarization arrays (e.g., BAVA, TCDA, OneWeb, future W×R, Due Regard Radar, and X-Band SAR). Beam weights may be adjusted to handle arbitrary polarization. Each beam may have independent arbitrary polarization, and can be applied to single elements or sub-arrays. For example, DBF processing update may be used with standard DBF.

Polarization control is applied to the beam weights or commands at a portion 418 of the beam formers 412a-n after control for beam forming is applied at a portion 422 in some embodiments. The beamforming control and the polarization control is applied using beam weights, and can be applied in the intermediate frequency (IF) portion or baseband portion of the beam formers 412a-n through mixers 424 in some embodiments. Polarization control is applied to the beam weights or commands at a portion 418 of the beam formers 412a-n after control for beam forming is applied at a portion 422 in some embodiments. In some embodiments, the antenna system 400 uses beamforming architecture to provide arbitrary polarization. Furthermore, the system 400 may be compatible with ABF, DBF architectures as well as with transmit or receive ESAs. The antenna system 400 may provide arbitrary polarization per beam given independent simultaneous beams (any combination of single element to full array) while performing simultaneous beamforming. Furthermore, the system 400 may be useful for polarization compensation at extreme scan angles.

C. Ultra-Wide Band and/or Greater Bandwidth Active Electronically Scanned Arrays for Element-Level Synthesis Systems and methods described herein can be utilized in spectrally agile, covert, A/J, reconfigurable, and/or directional communication systems. The networks for the communication systems may be ad-hoc, self-forming, software-defined. Systems and methods described herein can be utilized in positioning, navigation and timing (PNT) systems that may involve relative navigation links with 2-way time transfer for high anti-jam, high precision, and/or parent-to-swarming low-cost attributable children asset, among others. The systems and methods described herein also involve UWB DF, ES, EA, SIGINT/COMINT applications and radar applications for SAR, GMTI, D and A, and/or W×R systems. The systems and methods described herein are used in UWB AESA technologies, such as: low profile, Ultra-Ultra-Wide Band (($U^2$WB), ≥10:1 instantaneous Bandwidth (IBW)); independently steered, multi-beam operation; meeting frequencies of interest; and wide-scan volume coverage (>±60° conical scan volume); and/or polarization diversity. Systems and methods described herein achieve rapid, dynamic AESA polarization adjustment with polarization state change rates commensurate with AESA scan velocity profiles in some embodiments.

In some embodiments, systems and methods described herein are used to polarization match any arbitrary signals, such as vertically polarization (VP), horizontal polarization (HP), slant linear (45° inclined linear), right or left hand circuit polarization (RHCP/LHCP), right or left hand elliptical polarization (RHEP/LHEP). Examples of polarization states may include: VP or HP for weather, GMTRI, SAR, Sense and Avoid Radar, commercial wireless, cellular, WiFi, Hotspot, LAN, and 5G, among others; VP in addition to HP for parametric, remote sensing radar, ELINT/SIGINT/COMINT and jammer systems, among others, CDL, commercial wireless, cellular, WiFi, Hotspot, RCHP or LCHP for LAN, and 5G applications; slant linear for ELINT/SIGINT/COMINT and jammer systems; SatCom, radar, GPS, GNSS, and Precision Navigation Timing (PNT) systems. For advanced systems, other examples may include: Frequency, polarization and beam UWB "hopping" radars; IoT, mobile hot spots, and 5G back haul; and bit based BSK/M-ary modulation, among others. Other applications may include SatCom connectivity, weather, High altitude engine icing (HAIC), runway imaging radar, directional data link, and wireless cabin connectivity, among others.

Systems and methods described herein may be utilized in next generation SIGINT systems that optimally and agilely scan frequency, pointing angle and polarization states on the fly, in real time, within a given beam scan profile. Systems and methods described herein prerequisites may obtain dynamic polarization states changes over UWB Instantaneous Bandwidths (IBW), e. g., 10:1, on the order of microseconds or less. The systems methods described herein may be utilized to provide an extremely fast polarization state adjustment of the AESA as a function of beam scanning and frequency to prevent deterioration of the axial ratio (AR) of the standard polarization purity figure of merit (FOM) of dual orthogonal linear polarixation (DOLP). Systems and methods described herein can be employed to change polarization state faster than the AESA's beam scan rate in some embodiments. In some embodiments, the systems and methods use the concepts discussed above in sections a and b.

Figure 5A:
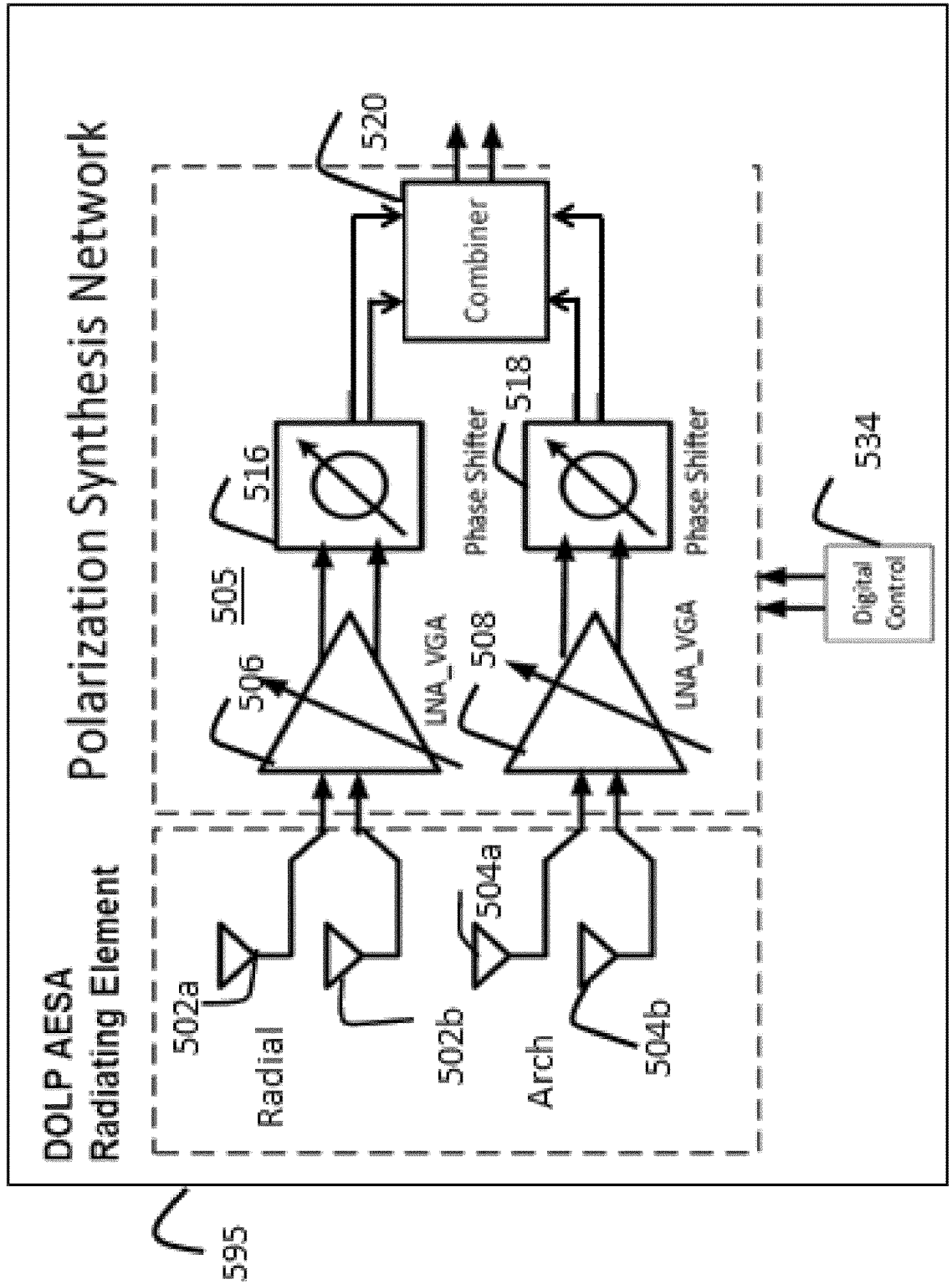
FIG. 5A is a schematic block diagram of an antenna system for ultra-wide band or greater bandwidth and configured for element-level synthesis in accordance with some embodiments of the inventive concepts disclosed herein.

Referring now to FIG. 5A, an antenna system 500 is for an ultra-wide band or greater active electronically scanned array and is configured for element-level polarization synthesis and beamforming. A polarization synthesis network 505 for each element of an array is coupled to antenna elements 502a and 502b and antenna elements 504a and 504b which represent differential inputs or outputs for antenna elements such as antenna element 404 and antenna element 406 (FIG. 4), respectively. The antenna elements 502a-b and 504a-b can be single ended elements in some embodiments. A polarization synthesis network similar to the polarization synthesis network 505 is coupled to other elements in the array. In some embodiments, the array is any one of the arrays disclosed in the patent applications incorporated by reference in this application (e.g., a UWB or greater wavelength scaled array (WSA) with 4 to 1 or instantaneous bandwidth). The polarization synthesis network 505 includes a variable gain amplifier 506, a variable gain amplifier 508, a phase shifter 516, a phase shifter 518, and a combiner 520. The polarization synthesis network 505 can be provided in the feed for the antenna arrays in some embodiments.

A digital control circuit 534 provides control signals to the variable gain amplifier 506, variable gain amplifier 508, phase shifter 516, and phase shifter 518 to provide appropriate adjustment to the polarization associated with the antenna elements 502a-b and 504a-b. The combiner 520 combines the signals from phase shifter 516 and 518 associated with the signals from the pair of elements 502a-b and the pair of the antenna elements 504a-b. Arbitrary adjustments as well as adjustments to provide horizontally and vertically polarized signals at the combiner 520 can be achieved. Elliptical polarization, circular polarization and orthogonal polarization can be provided using the polarization synthesis network 505 in some embodiments. The phase shifters 516 and 518 feature flat phase and broadband response as required for UWB PSN and phase based phase shift of the modulation band width, for the case where it is less than the IBW. Tunable IBW is important for phase center realignment and, to a lesser extent, beam steering a moderate information band width that can operate across a wide tunable bandwidth.

The variable gain amplifiers 506 and 508 respectively provide selected amplification for the signals of the antenna elements 502a-b and the signals of the antenna elements 504a-b. The phase shifters 516 and 518 respectively provide selected phase shifting for the signals of the antenna elements 502a-b and the signals of the antenna elements 504a-b. The digital control circuit 534 provides control signals to the variable gain amplifier 506, variable gain amplifier 508, phase shifter 516, and phase shifter 518 to make the adjustments in accordance with the geometry associated with the layout of the antenna elements 502a-b and the antenna elements 504a-b to provide orthogonally polarized signals in some embodiments. The digital control circuit 534 configures the polarization synthesis network 505 to provide a dual orthogonal linear pair response and/or beam steering for non-orthogonal dipole pairs in some embodiments. The techniques described in U.S. patent application Ser. No. 15/955,030, entitled, "Systems and Methods for Phase-Coincidental Dual Polarized Wideband Antenna Arrays," incorporated herein by reference in its entirety, "can be utilized to provide phase coincidence in some embodiments. In some embodiments, phase center alignment time delay for the elements 404 and 406 (FIG. 4) (e.g., for HP/VP) is absorbed within one or more of the phase shifters 516 and 518 (e.g., embodied as a modulo 360 degree phase shifter) in some embodiments. The control signals can be provided as a function of beam steering angle and frequency.

The polarization synthesis network 505 of the system 500 is based on miniature RFIC technology, SiGe, RF CMOS and SOI technologies in some embodiments. The polarization synthesis network 505 is incorporated at the element-level within the AESA architecture and provides the time delay (or phase shift) required to scan the AESA's beam. The above polarization synthesis network 505 is miniaturized through RFIC technology—to be size compatible (i.e. surface area) with a λ/2 by λ/2 unit cell size (at the highest operating frequency) of the AESA lattice. The polarization synthesis network 505 can be a standalone RFIC integrated with required LNA, phase shifter/time delay, and transmitter exciter circuits, among others. RF sub-circuit portioning may typically be specific systems dependent. In some embodiments, the polarization synthesis network 505, 596 (FIG. 5B), or 705 (FIG. 7) is used in level 1 of a hierarchically arranged antenna system as disclosed in U.S. patent application Ser. No. 16/123,854. Additional levels of the hierarchically arranged architecture can include time delay units, and level one does not include additional phase shifters or time delay units outside of the polarization synthesis networks 505, 596, and 705 in some embodiments.

In the antenna system 500, broadband RHCP/LHCP may be set by channel amplitude balance and ±90° phase shift across the entire Instantaneous/Information Bandwidth (IBW) as well as equi-phase and equi-amplitude signal combing in some embodiments. The polarization synthesis network 505 accepts VP and HP DOLP signals from the antenna elements 404 and 406 (FIG. 4) (differential interface represented by the antenna elements 502a and 502b and antenna elements 504a and 504b). The DOLP signals can either be differential (as shown in FIG. 5) or single ended. The amplifiers 506 and 508 and the phase shifters 516 and 518 as well as low noise amplifiers can utilize DAC/ADC/SPI bus technologies. The phase shifters 516 and 518 set differential phase for desired polarization state, and the amplifiers 506 and 508 and/or low noise amplifiers predominately set system NF and may provide broadband amplitude balance for slant linear and RHCP/LHCP polarization states in some embodiments. The amplifiers 506 and 508 and/or low noise amplifiers also provide design differential amplitude ratios for RHEP/LHEP. The two-channel solution may ensure precise adjustment of differential amplitude and phase to enable low axial ratio (AR) circular polarization.

Figure 5B:
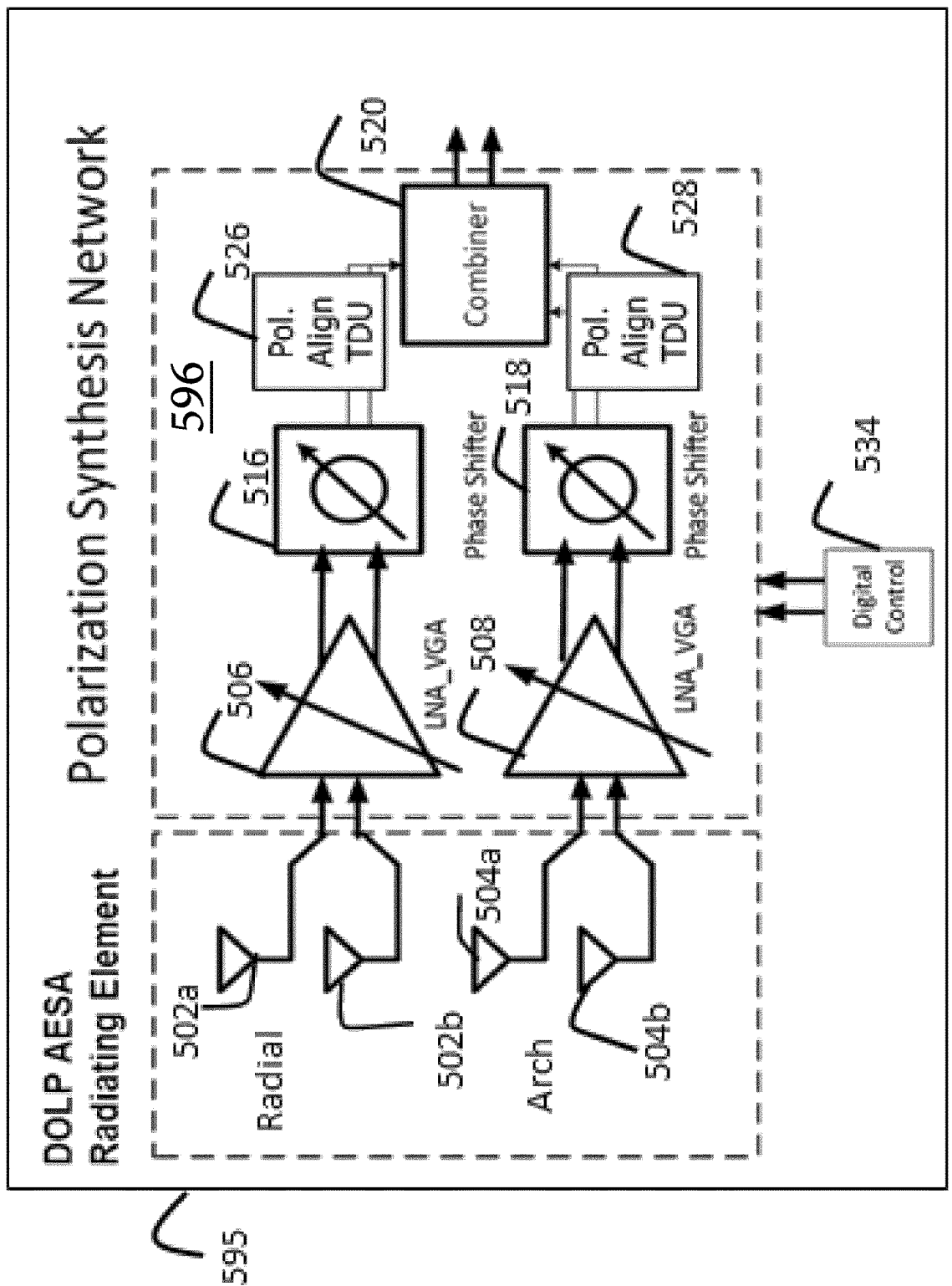
FIG. 5B is a schematic block diagram of an antenna system for ultra-wide band or greater bandwidth and configured for element-level synthesis in accordance with some embodiments of the inventive concepts disclosed herein.

With reference to FIG. 5B, the antenna system 595 is similar to the antenna system 500 and includes a polarization synthesis network 596 similar to the polarization synthesis network 505. The polarization synthesis network 596 includes a phase center alignment time delay unit 526 coupled between the combiner 520 and the phase shifter 516 and a phase center alignment time delay unit 528 coupled between the combiner 520 and the phase shifter 516. The phase center alignment time delay unit 526 and the phase center alignment time delay unit 528 respectively provide selected time delays for the signals of the antenna elements 502a-b and the signals of the antenna elements 504a-b. The phase center alignment time delay unit 526 and the phase center alignment time delay unit 528 allow time adjustment (e.g., coarse or fine) of time delay shift to be made for the signals of the antenna elements 502a-b and the signals of the antenna elements 504a-b in some embodiments to make the apparent phase centers of the vertical and horizontally polarized radiating element pairs within the dual orthogonal radiating elements to be electrically coincident. In some embodiments, the polarization alignment time delay unit 526 and the polarization alignment time delay unit 528 are embedded within the phase shifters 516 and 518 to provide phase center adjustment to provide aligned phase centers for the antenna elements 502a-b and the signals of the antenna elements 504a-b. The combiner 520 combines the signals from the phase center alignment time delay unit 526 and a phase center alignment time delay unit 528 associated with the signals from the pair of elements 502a-b and the pair of the antenna elements 504a-b. The phase center alignment time delay unit 526 and the phase center alignment time delay unit 528 are implemented in either the analog or digital domain. In either case, the least significant bit for the time delay command is adequate for distortion free AESA performance in some embodiments.

Figure 6A:
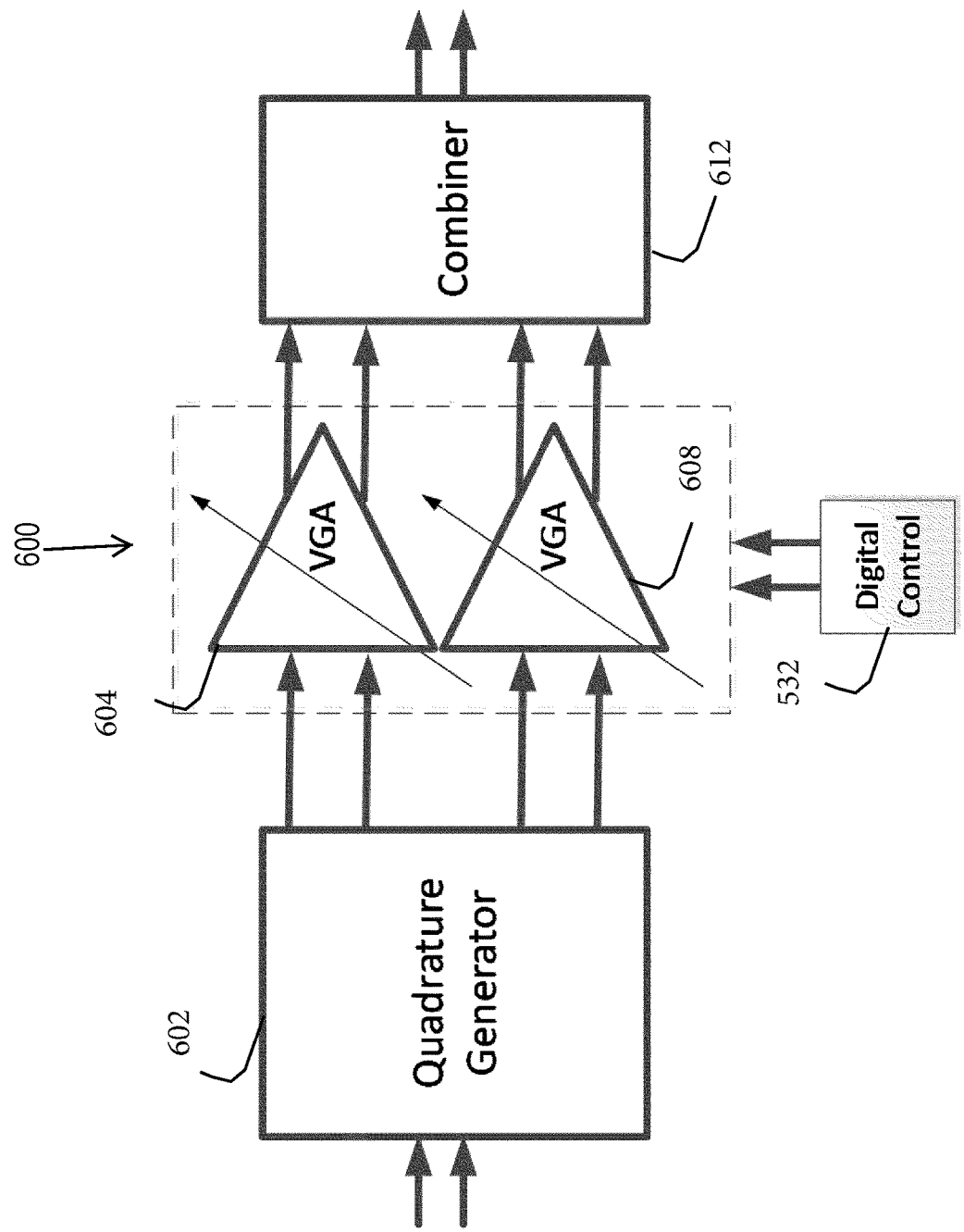
FIG. 6A is a block diagram of a vector modulator phase shifter for the antenna systems illustrated in FIGS. 5A and 5B in accordance with some embodiments of the inventive concepts disclosed herein.

Referring now to FIG. 6A, the phase shifters 516 and 518 of FIGS. 5A and 5B are each implemented as a separate vector modulator phase shifter 600 and is described below as being positioned as the phase shifter 516. The phase shifter 600 includes a quadrature generator 602 for receiving differential signals from the variable gain amplifier 506 (FIGS. 5A-B), a pair of variable gain amplifiers 606 and 608 and a combiner 612 for providing a differential output signal to the combiner 520 (FIGS. 5A-B). The variable gain amplifiers 606 and 608 receive differential in-phase and quadrature signals from the quadrature generator 602 and amplify the signals according to commands from the digital control circuit 532 to effect a phase change or shift.

In some embodiments, the vector modulator phase shifter 600 is extremely wide band (e.g., approximately a 10:1 IBW for the flat phase). The performance of the quadrature generator 602 sets the IBW of the vector modulator phase shifter 600, which in turn sets the IBW of the polarization synthesis network 505 (FIGS. 5A-B). The wideband quadrature blocks may have both excellent UWB IBW for amplitude/phase balance in some embodiments.

Figure 6B:
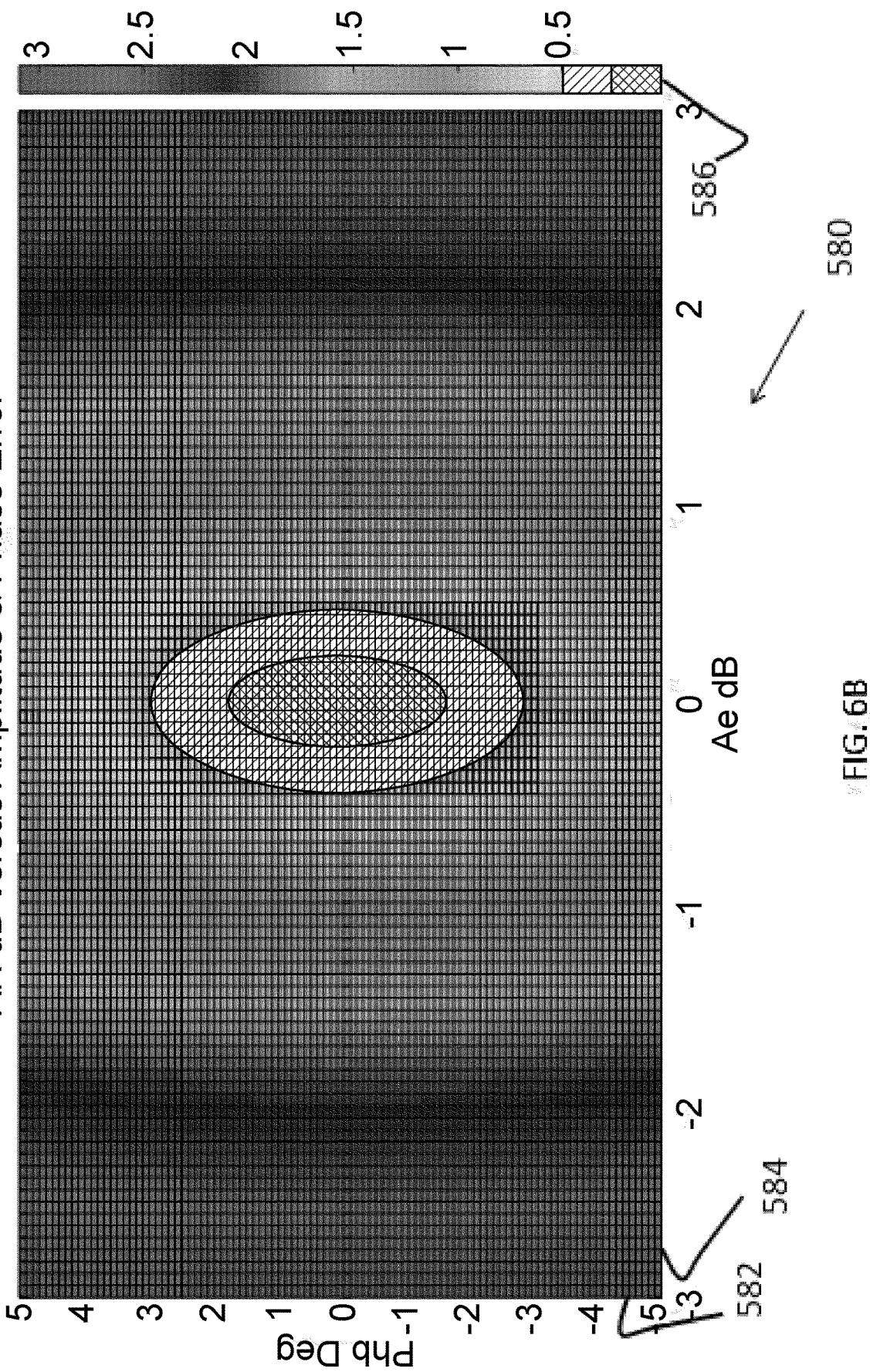
FIG. 6B is a graph of axial ratio decibel versus phase error and amplitude error of the antenna system for ultra-wide band or greater active electronically scanned arrays for element-level synthesis in accordance with some embodiments of the inventive concepts disclosed herein.

With reference to FIG. 6b, a graph 580 for a simulated response includes an Y-axis 582 represents phase error in degrees and a X-axis 584 representing amplitude error in decibels for a stage quadrature network within the phase shifters 516 and 518 embodied as a vector modulator phase shifter (VMPS) (e.g., the phase shifter 600). A scale 586 represents axial ratio dB from 0 to 3. The antenna systems 500 and 595 provide ±0.4 dB and ±2° phase variation for a 6 GHz IBW which can equate to a ≤0.5 dB Axial Ratio for quality right hand circular polarization, assuming a very intrinsic x-pol from the DLP radiating element in some embodiments. A measure of ±0.5 dB and ±3° phase is a flat amplitude and phase response over frequency which is advantageous. In some embodiments, a suitable flat response is less than ±2.0 dB and less than a ±5.0 phase change and realizes a 2.0 dB axial ration which is generally considered adequate circular polarization for non-critical system applications. In other embodiments, a suitable flat response is ±0.4 dB and ±2° phase variation for 2.5 GHz satellite communication applications.

Figure 7:
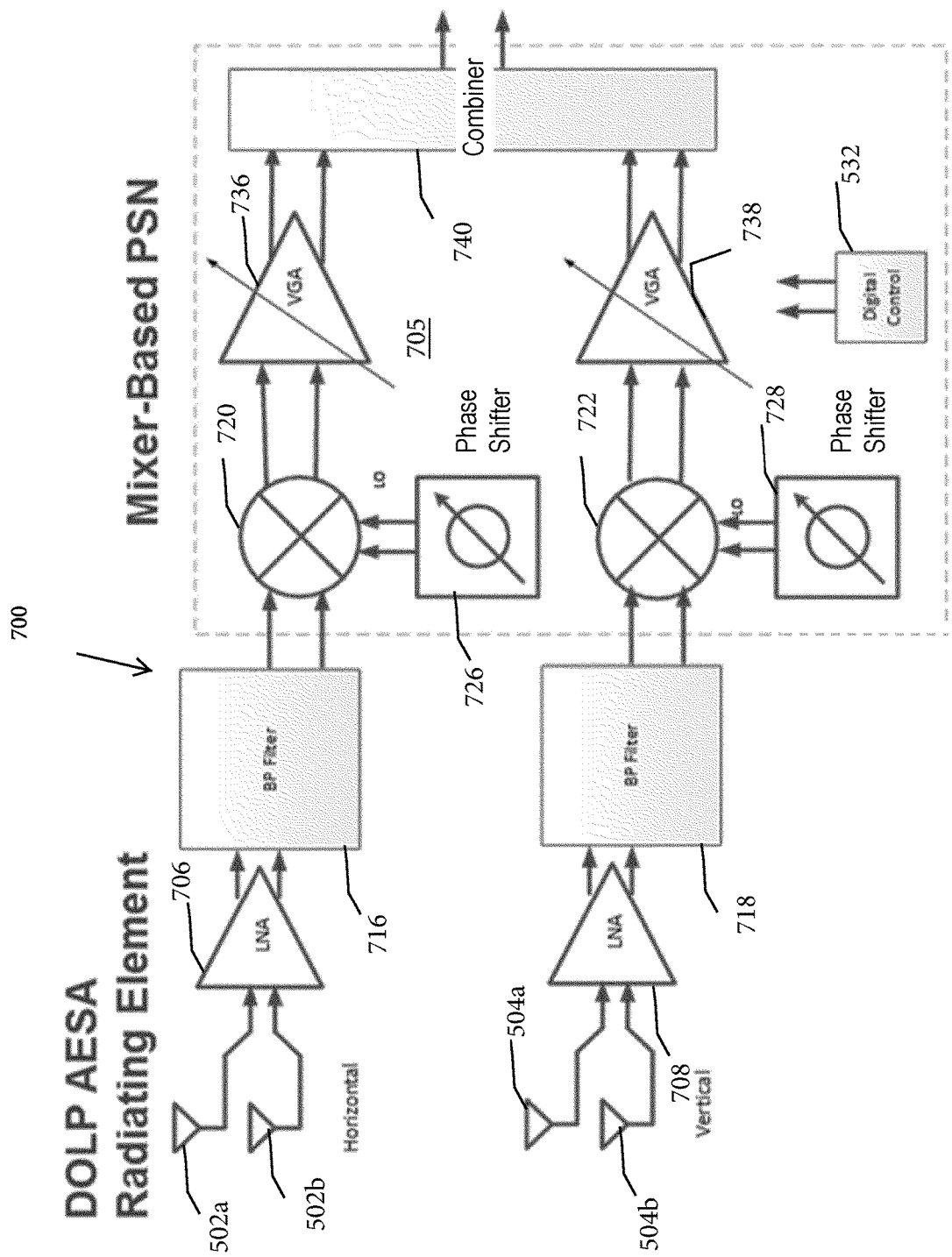
FIG. 7 is a schematic block diagram of an antenna system for ultra-wide band or greater bandwidth and configured for element-level, mixer based synthesis in accordance with some embodiments of the inventive concepts disclosed herein.

Referring now to FIG. 7, an antenna system 700 includes low noise amplifiers 706 and 708 coupled to differential elements 502a-b and 504a-b, band pass filters 716 and 718, and a polarization synthesis network 705. The polarization synthesis network 705 includes mixers 720 and 722, phase shifters 726 and 728, variable gain amplifiers 736 and 738, and a combiner 740. The band pass filters 716 and 718 are analog filters tuned to the RF frequency band for the application, and the low noise amplifiers are RF amplifiers.

Phase and amplitude channel balance for polarization channels (antenna elements 502a-b and 504 a-b is advantageously created at IF rather than RF in some embodiments. The local oscillator signals for the mixers 720 and 722 are phase shifted by the phase shifters 726 and 728 to produce phase shift at IF. The phase shifters 726 and 728 are each embodied as a vector modulator phase shifter (VMPS) (e.g., the phase shifter 600) and are provided on both channels to ensure UWB differential phase balance at IF in some embodiments. The IF IQ signals for the phase shifters 726 and 728 have much less layout parasitic sensitivities and lower loss in some embodiments. Performing IQ alignment at IF simplifies calibration across the very large RF bandwidth in some embodiments.

The antenna system 700 can also be used in the ultra-wideband flexible image rejection filtering techniques (high side, low side or both side selectable, and tunable bandwidth to allow increasing sensitivity over narrower IBW). The filtering method does not disturb delay in comparison to conventional filters in some embodiments. The system 700 may "self-heal" the passive quadrature block component value imperfections due to statistical tolerance or temp variations by calibrating the LO phase shifter and IF/RF amplitude balance. The antenna system 700 alters time delay versus frequency variation from the passive IF I/Q network. The IF I/Q combiner in the phase shifters 726 and 728 is configured to have very good time delay variation across a larger (4 GHz) IBW, still allowing for low broadband phase/amplitude error (<+/−0.3 deg and <+/−0.05 dB).

To realize an intra-AESA lattice polarization synthesis network as based on miniature RFIC technology, the polarization synthesis networks 505, 596 and 705 are miniaturized through RFIC technology to be size compatible (i.e. surface area) with the traditional λ/2 by λ/2 unit cell size (at the highest operating frequency) of the AESA lattice in some embodiments. The polarization synthesis networks 505, 596 and 705 are incorporated/integrated at the element-level within the AESA architecture, in addition to the time delay (or phase shift) required to scan the AESA's beam in some embodiments. The polarization synthesis networks 505, 596 and 705 can be a standalone RFIC integrated with required LNA, phase shifter/time delay, and transmitter exciter circuits, among others. RF subcircuit portioning may be typically specific systems dependent. The polarization synthesis networks 505, 596 and 705 can be uni-channel for dual VP/HP UWB AESA systems at the pre-splitter (Tx mode) or post combiner (Rx) Analog RF ports. The polarization synthesis networks 505, 596 and 705 can also be used for non-ESA, motor-scanned directional antenna systems, e.g., motor driven reflector systems. The polarization synthesis networks 505, 596 and 705 can also be used for UWB omnidirectional, polarization diverse systems as well.

Arrays for the antenna systems 500, 595 and 700 may have ultra-wideband active electronically scanned array elements with radiating non-coincident phase centers. A coincident phase center radiation element AESA can correspond to a superposition of a VP array with an HP array, both with identical phase centers (e.g., both at the element level and the aggregate array aperture level). Examples of coincident phase center radiation elements may include crossed dipoles, crossed drooping dipoles, planar crossed bow ties, spirals/sinuous/conical spirals, and certain classes of Vivaldi types. Issues with coincident phase centers may include parasitic coupling between VP and HP components, higher order mode parasitic generation, challenges in extracting separate VP and VP signal, poor cross polarization isolation, and complicated hardware implementation of feed structures particularly at millimeter wave frequencies. The antenna systems 500, 595 and 700 generate low AR CP within an ASEA that utilizes non-phase center coincident radiating elements with increased performance with commensurate reduction of hardware implementation complexity and parasitic mode suppression in some embodiments. The antenna systems 500, 595 and 700 are configured to re-align the phase centers of two superimposed VP and HP arrays by time delay analog signal processing at the AESA unit cell level and by using the element-level using the polarization synthesis networks 505 and/or 705 in some embodiments.

Non-phase center coincident (NPCC) VP and HP phase centers may be off set λ/4 vertically and λ/4 horizontally. Unit cell time delay may be used to re-align the radiating element phase centers. The VP phase center can be aligned with HP phase center, and vice-versa. The antenna systems 500, 595 and 700 using the polarization synthesis networks 505, 596 and/or 705 align both VP and HP phase centers to a new, common location in some embodiments. Parallelizing the vectors from the far field (FF) observation point may be equivalent to shifting the AESA's VP and HP coordinate system's origin to be identical via the principal of reciprocity. The required time delay calculation may be based on modelling NPCC unit cell as a two-element AESA. In addition, the time delay required for VP and HP alignment may be small since the two element AESA spacing is λ/4 vertically and λ/4 horizontally. The polarization alignment time delay may be superimposed on the time delay required for UWB squint/dispersion-free AESA beam steering. A 4 ps of delay is required for a λ/2 sampled array lattice (i.e. grating lobe free) AESA operating at 60 GHz in some embodiments.

Minimal signal distortion may occur since the small time delay required is a small percentage of a complete carrier frequency period (e.g., one period at 60 GHz=16.7 ps). The time of 3.92 ps may be used re-align the 60 GHz VP and HP offset phase centers in one example (3.92 ps/16.7 ps=24% of one period of 60 GHz signal for a 70° AESA beam scan off bore sight and less at shallower pointing angles). This relatively small carrier alignment may be utilized as an offset to the nominal modulo-360° phase commands used for beam steering. Alternatively, with more optimal distortion within the information bandwidth, time delay circuits (time delay units 526 and 528 (FIG. 5B)) can be integrated within the polarization synthesis networks 505, 596 and 705 to realign the VP and HP phase centers. The time delay circuits are either analog or a digital implementation with sufficiently small least significant bits for adequate distortion-free AESA performance.

In this manner, correction of axial ratio corruption, as a function of scan, of circularly polarized waves synthesized by an AESA may be comprised of radiating non-coincident phase center radiating elements. The antenna systems 500, 595 and 700 may enable the use of non-coincident phase center radiating elements for circularly polarized AESAs (while preserving low AR, etc.) to solve other element design issues, such as parasitic modes, etc., that are associated with coincident phase center AESA radiating elements. These phase center realignments and signal processing scheme can also be implement via digital signal processing (DSP)/Digital Beam Forming (DBF) signal processing. The architecture may simultaneously incorporate beam steering inter-element phase differential with intra-element differential polarization synthesis as described, thereby improving SWAP-C through reduced DC power consumption. The systems 500, 595 and 700 can be configured to adjust dynamically for polarizations state and beam steering as a function of frequency and beam scanning.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

The inventive concepts disclosed herein contemplate methods, systems and program products on any machine-readable media for accomplishing various operations. Embodiments of the inventive concepts disclosed herein may be implemented using existing computer operational flows, or by a special purpose computer operational flows for an appropriate system, incorporated for this or another purpose, or by a hardwired system. Embodiments within the scope of the inventive concepts disclosed herein include program products comprising machine-readable media for carrying or having machine-executable instructions or data structures stored thereon. Such machine-readable media can be any available media that can be accessed by a special purpose computer or other machine with an operational flow. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with an operational flow. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a special purpose computer, or special purpose operational flowing machines to perform a certain function or group of functions.

What is claimed is:

1. An antenna system, comprising:
   an ultra wide band or greater array of dual linear polarization elements, each of the dual linear polarization elements being disposed in a respective one-half wavelength by one-half wavelength unit size, the dual linear polarization elements comprising a first element have a first differential interface and a second element having a second differential interface; and
   a plurality polarization synthesis networks, wherein each of the polarization synthesis networks is coupled to the first differential interface of the first element of a respective dual linear polarization element of the dual linear polarization elements and the second differential interface of the second element of the respective the dual linear polarization element of the dual orthogonal linear polarization elements, wherein each of the polarization synthesis networks has a flat response for phase shift and amplitude over the ultra wide band width.

2. The antenna system of claim 1, wherein each of the polarization synthesis networks comprises a first variable gain amplifier coupled in series with the first differential interface, a second variable gain amplifier coupled in series with the second differential interface, a first phase shifter coupled in series with the first variable gain amplifier, a second phase shifter coupled in series with the second variable gain amplifier, and a combiner coupled in series with a first output of the first phase shifter and a second output of the second phase shifter, and wherein the respective one-half wavelength by one-half wavelength unit size is at the highest frequency for the ultra wide band or greater array.

3. The antenna system of claim 1, wherein first phase shifter comprises a quadrature generator in series with a third variable gain amplifier, a fourth variable gain amplifier and a combiner in series with the third variable gain amplifier and the fourth variable gain amplifier.

4. The antenna system of claim 1, wherein an instantaneous bandwidth is 4 to 1 for the array.

5. The antenna system of claim 1, wherein each of the polarization synthesis networks comprises a first mixer coupled in series with the first differential interface, a second mixer coupled in series with the second differential interface, a first variable gain amplifier coupled in series with the first mixer, a second variable gain amplifier coupled in series with the second mixer, a first phase shifter coupled to the first mixer, a second phase shifter coupled to the second mixer, and a combiner coupled in series with a first output of the first mixer and a second output of the second mixer.

6. The antenna system of claim 5, further comprising
   a first band pass filter coupled in series with the first mixer; and
   a second band pass filter coupled in series with the second mixer.

7. The antenna array of claim 1, wherein the dual linear polarization elements are associated with a first level of hierarchically arranged array architecture, and the polarization synthesis networks provide beam steering and polarization synthesis for the first level, and a second level of the hierarchically arranged array architecture achieves beam steering using time delay units.

8. The antenna array of claim 1, wherein the polarization synthesis networks provide both beam steering and polarization synthesis for the array.

9. The antenna array of claim 1, wherein the polarization synthesis networks are configured to provide a dual linear orthogonal response for the first element and the second element when the first element and the second element are non-orthogonal dipole pairs.

10. The antenna array of claim 1, wherein the first element and the second element are a non-orthogonal dipole pair, wherein the polarization synthesis network is configured to provide an arbitrary polarization response for the non-orthogonal dipole pair.

11. An antenna system, comprising:
    an array of dual linear polarization elements, each of the dual orthogonal linear polarization elements comprising a first element having a first differential interface and a second element having a second differential interface; and
a plurality polarization synthesis networks configured to provide both beam steering and polarization synthesis for the array, wherein each of the polarization synthesis networks has a flat response of phase shift and amplitude over the ultra wide bandwidth, and wherein each of the polarization synthesis networks is coupled to the first differential interface of the first element of a respective the dual linear polarization element of the dual linear polarization elements and the second differential interface of the second element of the respective the dual linear polarization element of the dual linear polarization elements, and wherein each of the polarization synthesis networks comprises:
    a first variable gain amplifier comprising a low noise amplifier for providing differential amplitude rations for right hand elliptical polarization and left hand elliptical polarization coupled in series with the first differential interface;
    a second variable gain amplifier comprising a low noise amplifier for providing differential amplitude rations for right hand elliptical polarization and left hand elliptical polarization coupled in series with the second differential interface;
    a first analog modulo phase shifter coupled in series with either the first variable gain amplifier, or each of a third variable gain amplifier, a fourth variable gain amplifier, and a combiner coupled in series with each of the third variable gain amplifier and the fourth variable gain amplifier;
    a second analog modulo phase shifter coupled in series with the second variable gain amplifier;

and a combiner coupled in series with a first output of the first analog modulo phase shifter and a second output of the second analog modulo phase shifter.

12. An antenna system, comprising:

an array of dual linear polarization elements, each of the dual orthogonal linear polarization elements comprising a first element having a first differential interface and a second element having a second differential interface;

a plurality polarization synthesis networks configured to provide both beam steering and polarization synthesis for the array at an intermediate phase shifting frequency, wherein each of the polarization synthesis networks is coupled to the first differential interface of the first element of a respective the dual linear polarization element of the dual linear polarization elements and the second differential interface of the second element of the respective the dual linear polarization element of the dual linear polarization elements, wherein each of the polarization synthesis networks comprises a first mixer coupled in series with the first differential interface, a second mixer coupled in series with the second differential interface, a first variable gain amplifier coupled in series with the first mixer, a second variable gain amplifier coupled in series with the second mixer, a first phase shifter coupled to the first mixer, a second phase shifter coupled to the second mixer, and a combiner coupled in series with a first output of the first mixer and a second output of the second mixer;

a first band pass filter coupled in series with the first mixer; and a second band pass filter coupled in series with the second mixer.

13. A method of providing phase coincidence for a pair of antenna elements comprising first linear polarized element and a second linear polarized element in an array, wherein the phase center of the first element and the second element are not physically aligned, the method comprising:

providing a first phase control signal to a first phase shifter for the first element in a polarization network;

providing a first amplitude control signal for the first element to a first variable gain amplifier in the polarization synthesis network;

providing a second phase control signal to a second phase shifter for the second element in the polarization network; and providing a second amplitude control signal for the second element to a second variable gain amplifier in the polarization synthesis network, wherein the first phase control signal, the second phase control signal, the first amplitude control signal, and the second amplitude control signal are provided to provide polarization and beam steering for the array, wherein the first phase control signal or the second phase control signal are provided to align electrically the phase center of the first element and the second element.

14. The method of claim 13, wherein the first amplitude control signal, and the second amplitude control signal are provided to reduce axial ratio corruption and wherein the polarization synthesis network is provided at an element level associated with the array.

\* \* \* \* \*